(12) United States Patent
Ujike et al.

(10) Patent No.: US 7,369,309 B2
(45) Date of Patent: May 6, 2008

(54) CONFOCAL MICROSCOPE

(75) Inventors: Tomoko Ujike, Hakaya (JP); Tomoya Noda, Kumagaya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/429,998

(22) Filed: May 9, 2006

(65) Prior Publication Data

US 2007/0014001 A1    Jan. 18, 2007

(30) Foreign Application Priority Data

May 10, 2005  (JP) .............................. 2005-137590

(51) Int. Cl.
*G02B 21/06* (2006.01)
(52) U.S. Cl. ................................... 359/388
(58) Field of Classification Search ................ 359/388, 359/385

See application file for complete search history.

(56) References Cited

U.S. PATENT DOCUMENTS 6,483,641 B1    11/2002 MacAulay .................. 359/385

FOREIGN PATENT DOCUMENTS

JP    9-325279    12/1997

OTHER PUBLICATIONS

M. Liang et al., "Confocal Pattern Period in Multiple-Aperture Confocal Imaging Systems with Coherent Illumination," Optics Letters, vol. 22, No. 11, Jun. 1, 1997, pp. 751-753.

*Primary Examiner*—Joshua L Pritchett
(74) *Attorney, Agent, or Firm*—Miles & Stockbridge, P.C.

(57) ABSTRACT

A confocal microscope with improved light use efficiency is provided. Thus, the confocal microscope has a section which concentrates illumination light to a target point of a specimen and non-target points adjacent thereto for simultaneous illumination; a section which receives light entering into a light reception portion conjugated with the target point, without distinguishing light emitted from the target point and light emitted from the non-target points, and outputs a light reception signal according to the intensity of the light; a section which changes the number of non-target points and successively captures the light reception signals before and after the change in the number of the target points; and a section which generates a confocal signal according to intensity of light emitted from the target point, based on a relationship between the captured light reception signals and the number of non-target points.

6 Claims, 11 Drawing Sheets

(a) 20 (specimen plane)

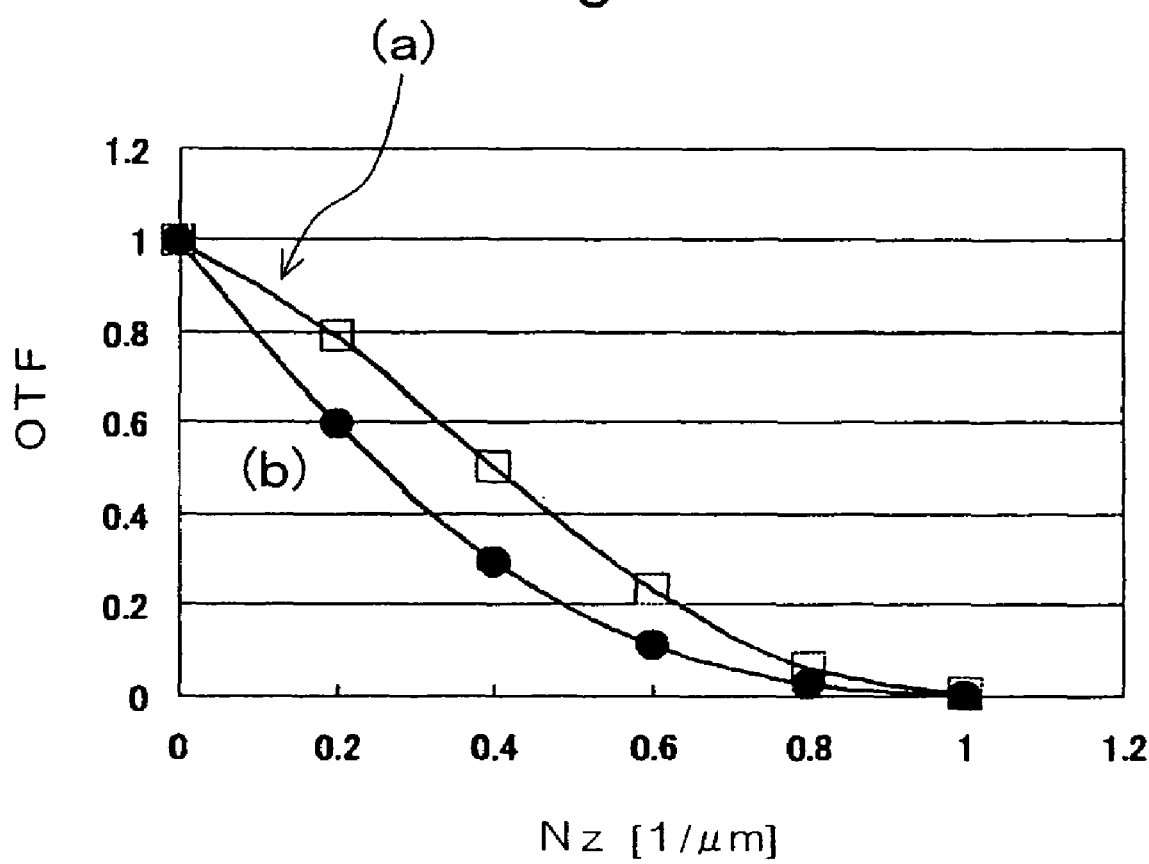

CONFOCAL MICROSCOPE

CROSS REFERENCE TO RELATED APPLICATION

This application is based upon and claims the benefit of priority from Japanese Patent Application No. 2005-137590, filed on May 10, 2005, the entire contents of which are incorporated herein by reference.

BACKGROUND OF THE INVENTION

1. Field of the Invention

The present invention relates to a confocal microscope for confocal observation of a specimen.

2. Description of the Related Art

In a confocal microscope, illumination light is concentrated at one point of a specimen. The intensity of light emitted from the point is measured by a sensor. The same operation is repeated while the measured point is two-dimensionally scanned on the specimen. Thus, an image intensity distribution of the specimen is obtainable with high resolution, enabling confocal observation. To effectively perform the confocal observation, there has been proposed a multi-point scanning system using a Nipkow disc, for example (for example, refer to Japanese Unexamined Patent Application Publication No. Hei 9-325279). In this case, adjacent measured points are set with an interval in accordance with an interval of adjacent pinholes of the Nipkow disc, thereby preventing light emitted from the measured points from mixing each other on the sensor (namely, a confocal effect is maintained).

However, the multi-point scanning system has a problem of low light use efficiency since the aperture ratio of pinholes of the Nipkow disc is low, so that among light emitted from a light source, only a small amount of light that passes through the pinholes illuminates a specimen.

SUMMARY OF THE INVENTION

An object of the present invention is to provide a confocal microscope with improved light use efficiency.

A confocal microscope according to the present invention has an illumination section which concentrates illumination light to each of a target point and non-target points of a specimen for simultaneous illumination, the non-target points being adjacent to the target point; a light reception section which receives light entering into a light reception portion conjugated with the target point, without distinguishing light emitted from the target point and light emitted from the non-target points when the illumination section illuminates the target point and the non-target points, and which outputs a light reception signal in accordance with an intensity of the received light; a control section which controls the illumination section to change a number of the non-target points and successively captures light reception signals which are output from the light reception section before and after the change in the number of the target points; and a generation section which generates a confocal signal in accordance with an intensity of light emitted from the target point, on a basis of a relationship between the light reception signals captured by the control section and the number of the non-target points.

It is preferred that the generation section generate the confocal signal and a non-confocal signal which corresponds to the intensity of light emitted from the non-target points, and generate a difference signal between the confocal signal and the non-confocal signal.

BRIEF DESCRIPTION OF DRAWINGS

The nature, principle, and utility of the invention will become more apparent from the following detailed description when read in conjunction with the accompanying drawings in which like parts are designated by identical reference numbers, in which:

FIG. 13 is a schematic diagram showing an illumination pattern of a compared example;

FIG. 15 is a schematic diagram showing an effect of the difference obtaining processing.

DESCRIPTION OF THE PREFERRED EMBODIMENTS

Next, with reference to the accompanying drawings, embodiments of the present invention will be described.

First Embodiment

Figure 1:
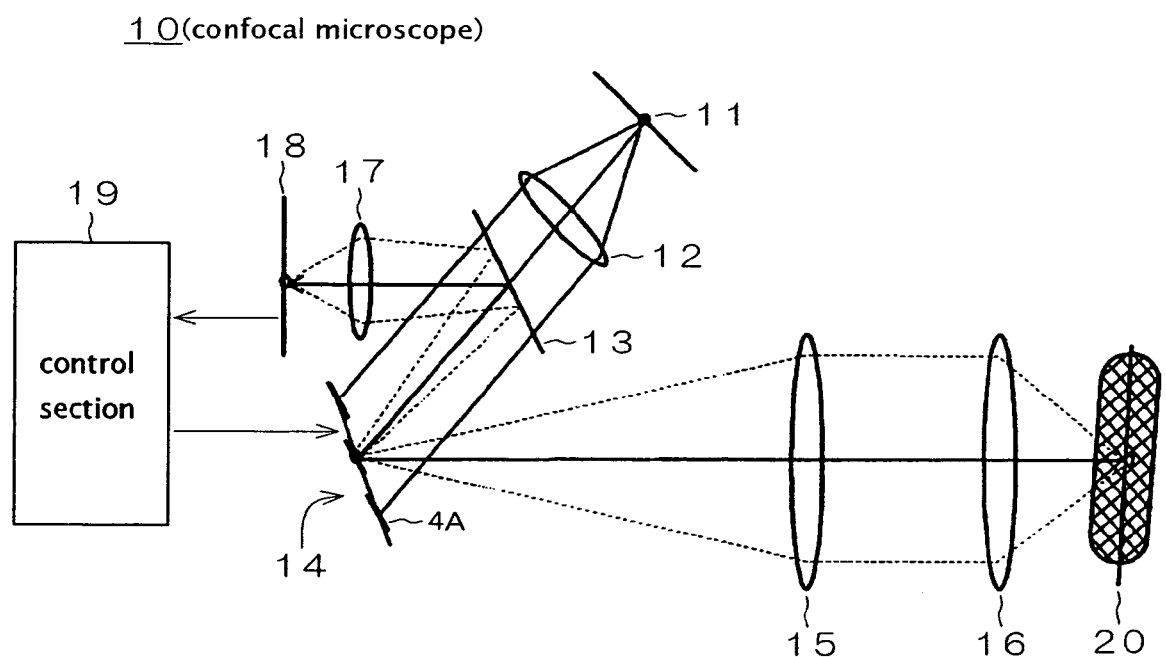
FIG. 1 is a schematic diagram showing an overall structure of a confocal microscope 10.

As shown in FIG. 1, a confocal microscope 10 of a first embodiment of the present invention is composed of an illumination section (11 to 16), an image formation section (13 to 17), an optical detector 18, and a control section 19. The illumination section (11 to 16) is composed of a light source 11, a condenser lens 12, a dichroic mirror 13, a mirror device 14, and lenses 15 and 16. The image formation section (13 to 17) is composed of the lenses 15 and 16, the mirror device 14, the dichroic mirror 13, and the lens 17.

Figure 2:
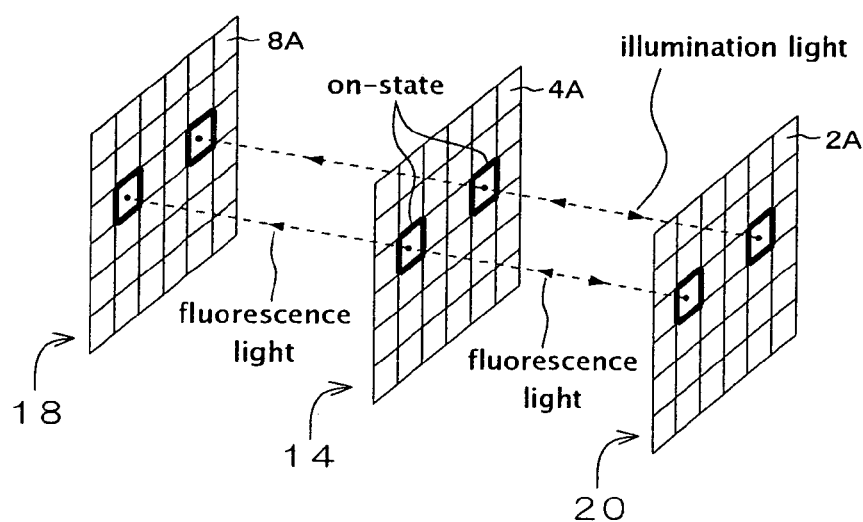
FIG. 2 is a schematic diagram showing the relationship among micromirrors 4A, light reception portions 8A, and micro areas 2A.

The mirror device 14 has many micromirrors 4A that are two-dimensionally arranged (also see FIG. 2). The inclination angles of the micromirrors 4A can be adjusted at high speed (for example, the mirror device 14 is a DMD (Digital Micromirror Device)). The optical detector 18 is an image pickup device, for example a CCD. The optical detector 18 has many light reception portions 8A that are two-dimensionally arranged (see FIG. 2). Each of the light reception portions 8A is composed of at least one pixel of the image pickup device. The mirror device 14 and the optical detector 18 are placed on planes that are conjugated with each other. In addition, the optical detector 18 is placed on a plane that is conjugated with a specimen plane 20.

FIG. 2 shows the light reception portions 8A of the optical detector 18, the light reception portions 8A corresponding to the micromirrors 4A of the mirror device 14. FIG. 2 also shows the specimen plane 20 that is divided into many microareas 2A corresponding to the two-dimensional arrangement of the micromirrors 4A (the two-dimensional arrangement of the light reception portions 8A). The microareas 2A are respectively conjugated with the micromirrors 4A. In addition, the microareas 2A are respectively conjugated with the light reception portions 8A. FIG. 2 shows that each of the microareas 2A, the micromirrors 4A, and the light reception portions 8A has the same size. However, the size of each of the microareas 2A, the size of each of the micromirrors 4A, and the size of each of the light reception portions 8A may not be always the same due to focal distances of the lenses 15 to 17, for example.

Light emitted from the light source 11 passes through the condenser lens 12 and the dichroic mirror 13 and then equally illuminates the many micromirrors 4A. Some micromirrors 4A are inclined at an illumination angle (hereinafter these micromirrors are referred to as "on-state micromirrors 4A"). The other micromirrors 4A are inclined at a non-illumination angle that is different from the illumination angle (hereinafter, these micromirrors 4A are referred to as "off-state micromirrors 4A"). The micromirrors 4A can be turned on/off with a control signal supplied from the control section 19 at high speed.

An on-state micromirror 4A of the many micromirrors 4A reflects and directs light that comes from the dichroic mirror 13 toward the lens 15. This light passes through the lenses 15 and 16 and reaches the specimen plane 20 as illumination light. The incident position of the illumination light on the specimen plane 20 is a microarea 2A conjugated with an on-state micromirror 4A of the many micromirrors 4A of the mirror device 14. The illumination light that has reached the microarea 2A is concentrated at one point of the microarea 2A. Light reflected on off-state micromirrors 4A does not reach the specimen plane 20.

In the microarea 2A on the specimen plane 20 that the illumination light has entered, a fluorescent substance is excited by the illumination light, causing emission of fluorescence light from the fluorescent substance. This fluorescence light passes through the lenses 16 and 15 and reaches an on-state micromirror 4A of the mirror device 14. The fluorescence light is reflected by the on-state micromirror 4A and directed toward the dichroic mirror 13. The fluorescence light enters the optical detector 18 through the dichroic mirror 13 and the lens 17. In the optical detector 18 the fluorescence light is incident to a light reception portion 8A conjugated with an on-state micromirror 4A of the mirror device 14 among the many light reception portions 8A.

Thus, in the confocal microscope 10 of the first embodiment, among the many microareas 2A on the specimen plane 20, a microarea 2A conjugated with an on-state micromirror 4A of the mirror device 14 is illuminated. Fluorescence emitted from the microarea 2A is reflected by an on-state micromirror 4A and directed toward the optical detector 18. The fluorescence light is detected by a light reception portion 8A conjugated with the on-state micromirror 4A. Thus, fluorescence light in any illumination pattern is detectable by changing the on/off states of the micromirrors 4A.

Figure 3:
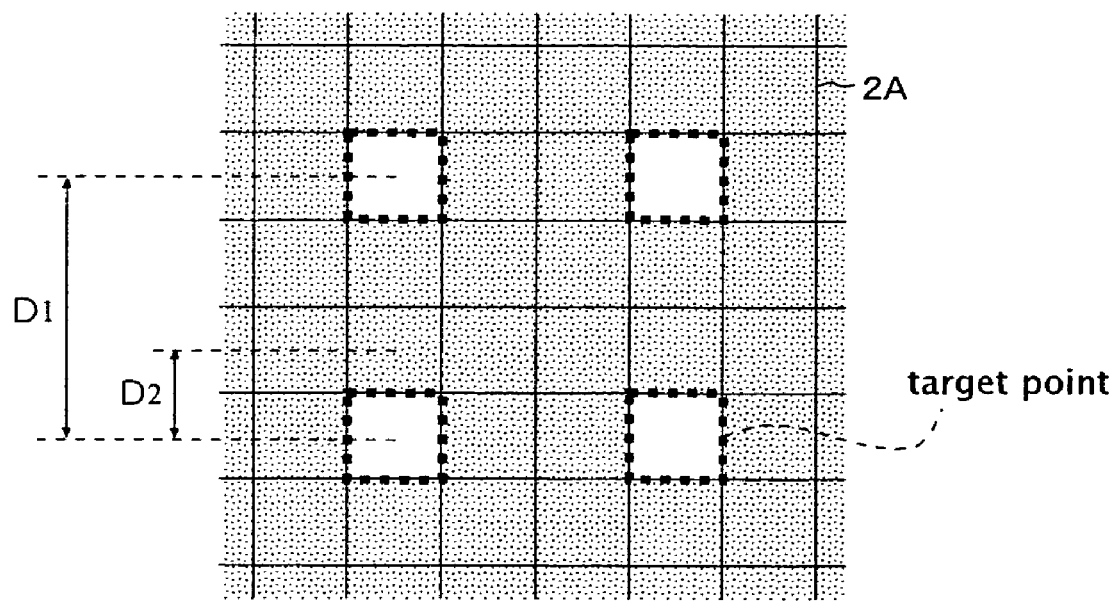
FIG. 3 is a schematic diagram showing an illumination pattern with which only a target point 2A is illuminated.
Figure 3:
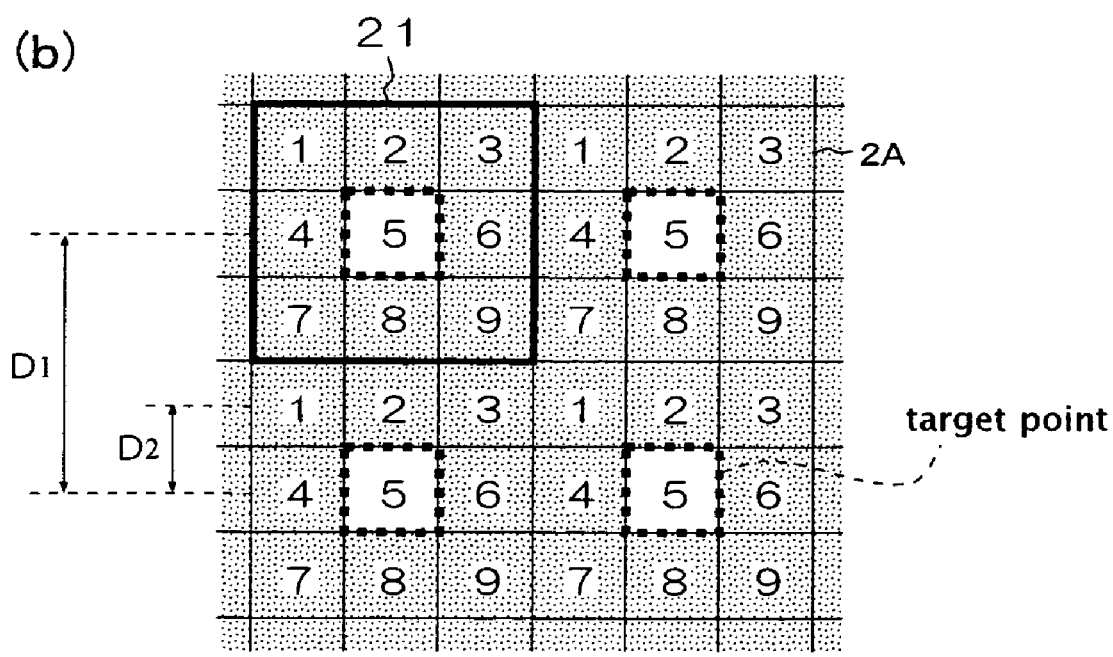

When an illumination pattern shown in FIG. 3(a) is formed on the specimen plane 20, a plurality of microareas 2A thereon with a predetermined interval D1 from each other are illuminated. In FIG. 3(a), white areas represent illuminated microareas 2A, whereas hatched areas represent non-illuminated microareas 2A. Fluorescence emitted from the illuminated microareas 2A (hereinafter referred to as "target points 2A") are detected by light reception portions 8A respectively conjugated with the target points 2A. At this point, the interval D1 of adjacent microareas 2A is designated so as to maintain a confocal effect. When the target points 2A are two-dimensionally scanned on the specimen plane 20, an image intensity distribution on the specimen plane 20 can be obtained with high resolution. As a result, confocal observation can be performed.

In the following description, it is assumed that the interval D1 to maintain the confocal effect is, for example, two times an interval D2 of adjacent microareas 2A. Each of the target points 2A with the interval D1(=D2×3) and eight microareas 2A adjacent thereto are generally referred to as a unit 21 (FIG. 3(b)). Each of units 21 contains a total of nine microareas 2A (in an array of 3×3). The center of the nine microareas 2A is a target point 2A. In FIG. 3(b), the nine microareas 2A in the unit 21 are designated by numbers "1" to "9" for convenience.

In the illumination pattern shown in FIG. 3(b), with illumination only to the target points 2A designated by "5" in the units 21, fluorescence lights emitted from adjacent target points 2A enter light reception portions 8A adjacent with each other and conjugated with the target points 2A, respectively, so that they do not mix with each other. Thus, a signal that is output from one light reception portion 8A is a confocal signal corresponding to the intensity of fluorescence light emitted from one target point 2A. Likewise, a signal that is output from another light reception portion 8A is a confocal signal corresponding to the intensity of fluorescence light emitted from another target point 2A.

In contrast, in the illumination pattern as shown in FIG. 4(a), simultaneous illumination not only to target points 2A designated by "5" of units 21 but to adjacent microareas 2A designated by "1" and "9" (hereinafter referred to as "non-target points 2A") produces different results. Since the interval between the target points 2A and non-target points 2A in a unit 21 is too narrow to maintain the confocal effect, not only fluorescence light emitted from the target points 2A but part of fluorescence light emitted from each of the non-target points 2A (leaked light) enters light reception portions 8A conjugated with the target points 2A.

The light reception portions 8A conjugated with the target points 2A non-distinguishably receive fluorescence light from the target point 2A and leaked light from the non-target points 2A and outputs a light reception signal corresponding to the intensity of the received light. In this case, the light reception signal is the sum of a confocal signal corresponding to the intensity of the fluorescence light emitted from the target point 2A and a non-confocal signal corresponding to the intensity of leaked light from the non-target points 2A. Thus, with the light reception signal, an image intensity distribution on the specimen plane 20 cannot be obtained with high resolution.

However, a light reception signal captured in the illumination pattern shown in FIG. 4(b) is combined with a light reception signal captured in the illumination pattern shown in FIG. 4(a) to subtract the non-confocal signal from the light reception signal through a predetermined processing and extract the confocal signal only. Thus, with the confocal signal extracted in the signal processing, an image intensity distribution on the specimen plane 20 can be obtained with high resolution.

In addition, for the signal processing, the non-confocal signal contained in the light reception signal is assumed as follows. That is, in the illumination pattern shown in FIG. 5, it is assumed that when all microareas 2A (non-target points 2A designated by "1" to "4" and "6" to "9") other than a target point 2A designated by "5" in each unit 21 are simultaneously illuminated, the light reception signal that is output from a light reception portion 8A conjugated with the target point 2A is "b". The light reception signal (b) is a non-confocal signal corresponding to the total intensity of the leaked light from the non-target points 2A designated by "1" to "4" and "6" to "9" in each unit 21. Note that, it is assumed that there is no leaked light entering from the outside of the unit 21.

For simplicity, it is assumed that non-target points 2A equally contribute to a light reception signal. In this case, the non-confocal signals are equal to each other due to the non-target points 2A designated by "1" to "4" and "6" to "9", namely, (⅛)b. In addition, when only the target point 2A designated by "5" in the unit 21 is illuminated in the illumination pattern as shown in FIG. 3(b), the light reception signal is assumed to be "a". This light reception signal (a) is equal to the confocal signal corresponding to the intensity of fluorescence light emitted from the target point 2A.

With use of the confocal signal (a) due to a target point 2A in the unit 21 and the non-confocal signal (⅛) b due to each of non-target points 2A in the unit 21, a light reception signal S1 can be expressed by the following formula (1) in which a target point 2A designated by "5" and two non-target points 2A designated by "1" and "9" are simultaneously illuminated in the illumination pattern shown in FIG. 4(a).

$$S1 = a + (\tfrac{1}{8})b \times 2 \quad (1)$$

Next, the illumination pattern shown in FIG. 4(b) will be described. In the illumination pattern shown in FIG. 4(b), a target point 2a designated by "5" and four non-target points 2A designated by "2," "4," "6," and "8" adjacent thereto in a unit 21 are simultaneously illuminated. In this case, a light reception signal S2 that is output from a light reception portion 8A conjugated with the target point 2A can be expressed by the following formula (2).

$$S2 = a + (\tfrac{1}{8})b \times 4 \quad (2)$$

According to the confocal microscope 10 of this embodiment, for example when controlling the mirror device 14 to form the illumination pattern shown in FIG. 4(a) on the specimen plane 20, the control section 19 captures a light reception signal (S1) that is output from a light reception portion 8A conjugated with the target point 2A designated by "5" in the unit 21. Thereafter, it changes the number of non-target points 2A (from two to four). When forming the illumination pattern shown in FIG. 4(b) on the specimen plane 20, it captures a light reception signal (S2) that is output from a light reception portion 8A conjugated with the target point 2A designated by "5" in the unit 21.

In such a manner, upon capturing light reception signals (S1 and S2) successively in different illumination states that areas other than the target point 2A in the unit 21 are illuminated in different manners (the number of non-target points 2A is changed), the control section 19 simultaneously applies the foregoing formula (1) with respect to the relationship between one light reception signal (S1) and the number of non-target points (two) and the foregoing formula (2) with respect to the relationship between the other light reception signal (S2) and the number of non-target points 2A (four) and generates a confocal signal (a) corresponding to the intensity of fluorescence light emitted from the target point 2A.

The confocal signal (a) generated in the two types of illumination patterns shown in FIGS. 4(a) and 4(b) is a signal associated with the target point 2A designated by "5" in the unit 21. The confocal signal corresponds to the light reception signal in the illumination pattern shown in FIG. 3(b). Likewise, assuming that a microarea 2A designated by "9" is a target point 2A and it is the center of a unit 22, with two types of illumination patterns shown in FIGS. 6(a) and 6(b), a confocal signal (a) associated with the target point 2A designated by "9" is generated.

Likewise, each of the microareas 2A designated by "1" to "4" and "6" to "8" is designated as a target point 2A. With two types of illumination patterns, which differ in the number of non-target points 2A, a confocal signal (a) associated with each of the target points 2A is generated. When target points 2A are two-dimensionally scanned on the specimen plane 20, an image intensity distribution on the specimen plane 20 can be obtained with high resolution. As a result, a confocal observation can be performed.

In the confocal microscope 10 of this embodiment, a plurality of target points 2A arranged with the interval D1(=D2×3) to maintain the confocal effect are illuminated on the specimen plane 20. In addition, since non-target points 2A arranged with an interval too narrow to maintain the confocal effect with the target points 2A simultaneously are illuminated, light use efficiency of the light source 11 is improved in comparison with that of a confocal microscope 10 that uses a conventional Nipkow disc. As a result, S/N ratio is improved.

In addition, in the confocal microscope 10 of this embodiment, the mirror device 14 (FIG. 2), which has a plurality of micromirrors 4A, are used in common on an optical path through which illumination light of the light source 11 is directed toward the specimen plane 20 and an optical path through which fluorescence light emitted from the specimen plane 20 is directed toward the optical detector 18. As a result, the apparatus can be simplified.

The processing for changing the on/off states of the micromirrors 4A of the mirror device 14 and two-dimensionally scanning the target points 20 on the specimen plane 20 can be simplified as follows. When a unit 22 including a microarea 2A designated by "9" as a target point on a specimen plane 20 shown in FIG. 6(a) and microareas 2A designated by "5" and "1" as non-target points is replaced with a unit 21 whose center is a microarea 2A designated by "5," an illumination pattern shown in FIG. 6(c) is obtained. Thus, it is clear that the illumination pattern of the unit 22 is the same as that of the unit 21 shown in FIG. 4(a).

Figure 4:
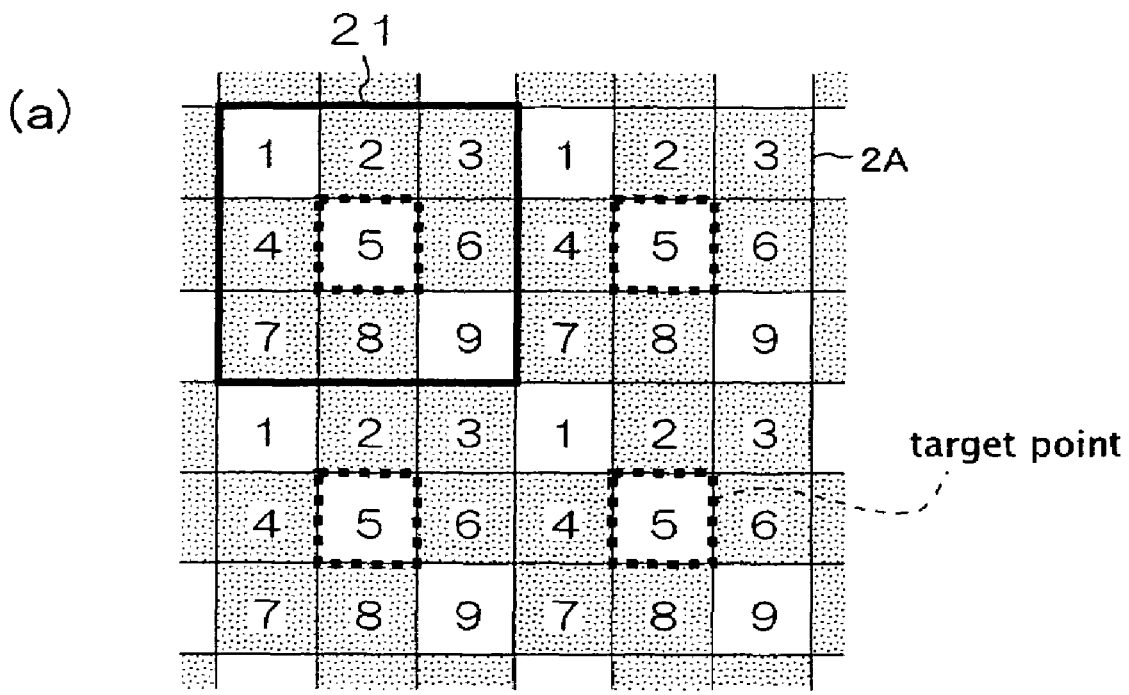
FIG. 4 is a schematic diagram showing an illumination pattern (a) with which a target point 2A and two non-target points 2A are simultaneously illuminated and an illumination pattern (b) with which a target point 2A and four non-target points 2A are simultaneously illuminated.
Figure 4:
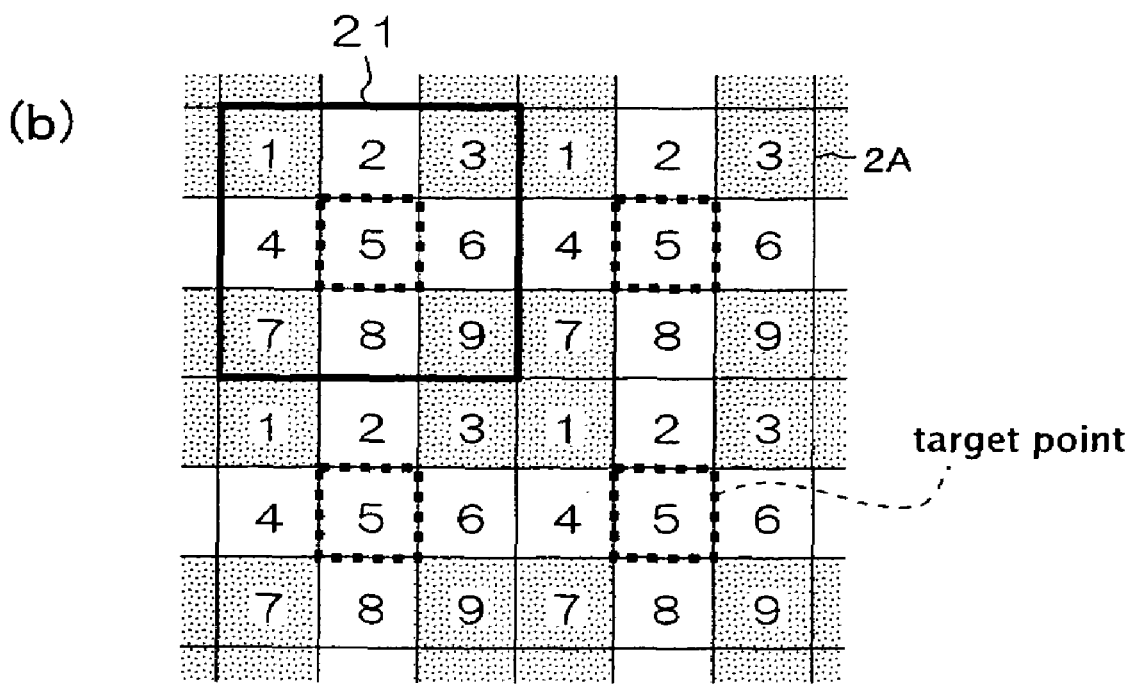
Figure 6:
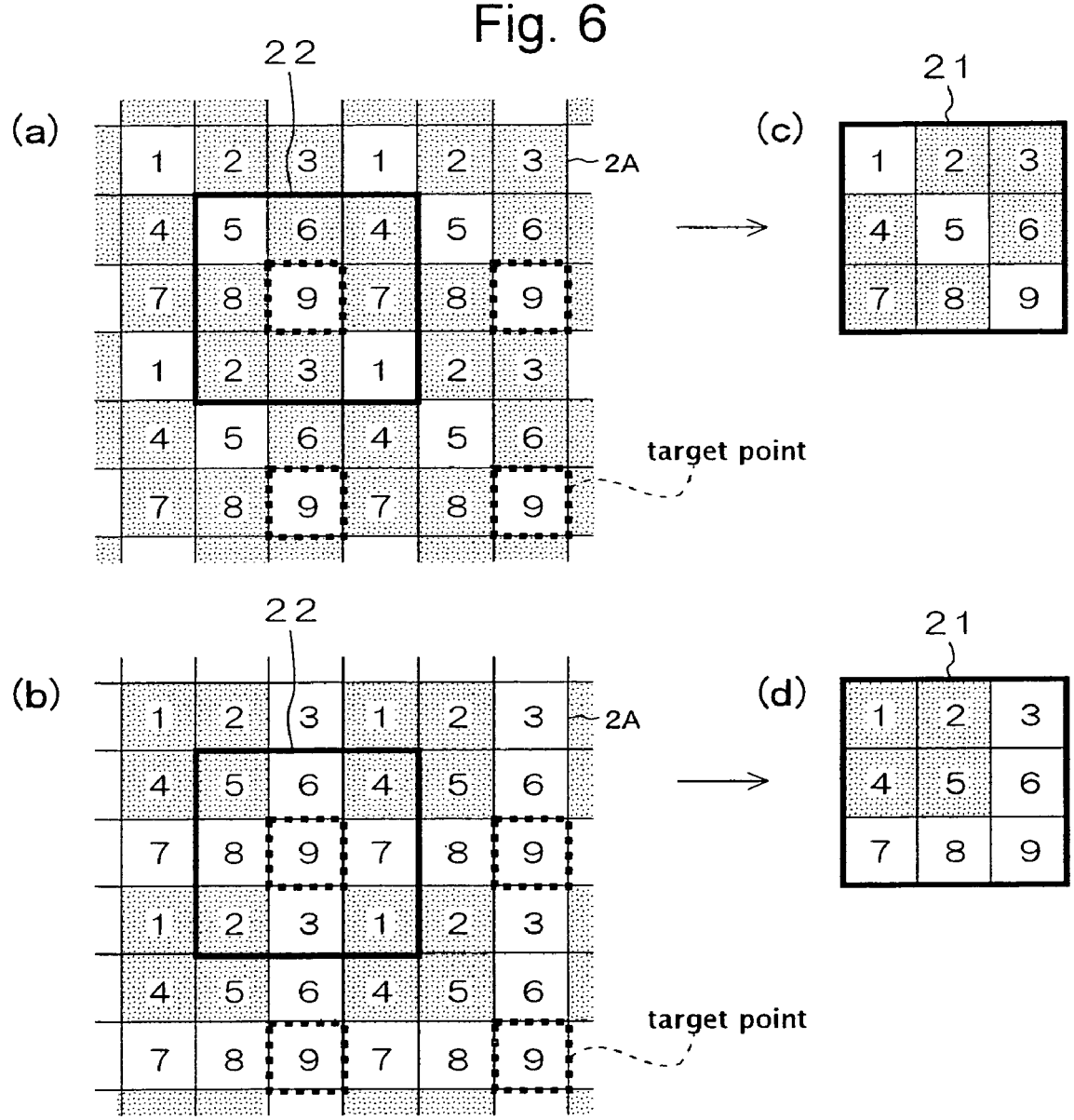
FIG. 6 is a schematic diagram showing two-dimensional scanning of target points 2A.

Thus, with the illumination pattern of the unit 21 shown in FIG. 4(a) formed on the specimen plane 20, the illumination pattern of the unit 22 shown in FIG. 6(*a*) is omissible when light reception signals (S1) are captured from light reception portions 8A conjugated with microareas designated by "5" and "9" in the unit 21. In addition, with the illumination pattern shown in FIG. 4(*a*) formed, it is preferred that a light reception signal (S1) be captured from a light reception portion 8A conjugated with a microarea designated by "1" in the unit 21.

When the illumination pattern shown in FIG. 4(*a*) is formed, and light reception signals (S1) are captured from light reception portions 8A conjugated with illuminated microareas 2A designated by "1," "5," and "9" in the unit 21, confocal signals (a) are generated with these microareas 2A set as target points 2A, using the light reception signals (S1). For example, a light reception signal (S1) from a light reception portion 8A conjugated with a microarea 2A designated by "1" is used for generating a confocal signal (a) with the microarea 2A designated by "1" set as a target point 2A.

Figure 7:
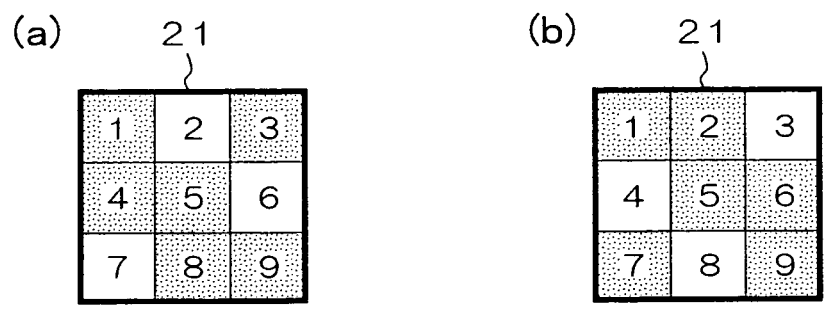
FIG. 7 is a schematic diagram showing another illumination pattern with which a target point 2A and two non-target points 2A are simultaneously illuminated.

Likewise, for illuminating microareas 2A designated by "2," "6," and "7" in the unit 21 in an illumination pattern shown in FIG. 7(*a*), light reception signals (S1) are captured from light reception portions 8A conjugated with these microareas 2A, to generate confocal signals (a) with the microareas 2A set as target points, using the light reception signals (S1). In an illumination pattern shown in FIG. 7(*b*), confocal signals (a) are generated with the microareas 2A set as target points and designated by "3," "4," and "8," using the light reception signals (S1).

When two microareas 2A at an upper left position and a lower right position of a target point 2A are designated as non-target points, only successively forming three illumination patterns as shown in FIG. 4(*a*), FIG. 7(*a*), and FIG. 7(*b*) on the specimen plane 20 makes it possible to effectively capture light reception signals (S1) associated with microareas 2A designated by "1" to "9" in the unit 21.

Figure 8:
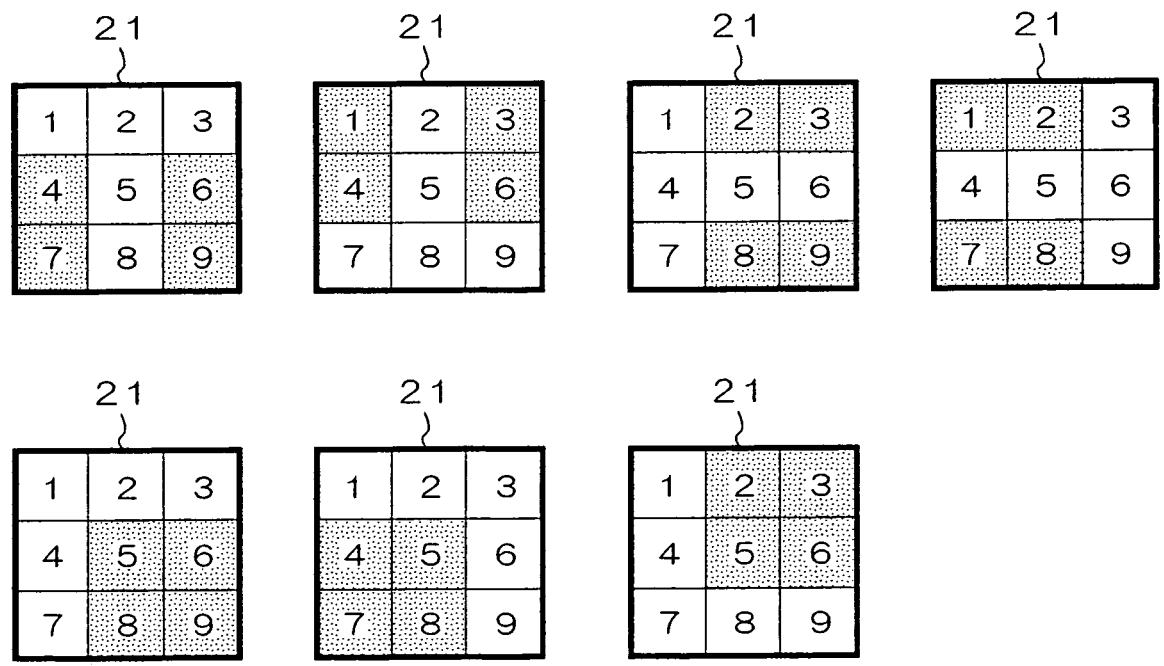
FIG. 8 is a schematic diagram showing another illumination pattern with which a target point 2A and four non-target points 2A are simultaneously illuminated.

However, an illumination pattern in FIG. 6(*b*) is such that in the unit 22 the microarea 2A designated by "9" on the specimen plane 20 shown is set as a target point 2A and the microareas 2A designated by "3," "6," "7," and "8" are set as non-target points 2A. When the unit 22 is replaced with the unit 21 whose center is the microarea 2A designated by "5," the illumination pattern will change to an illumination pattern shown in FIG. 6(*d*), which is different from the illumination pattern of the unit 21 shown in FIG. 4(*b*). Thus, for designating four microareas 2A at upper, lower, left, and right positions of the target point 2A as non-target points 2A, it is necessary to form nine illumination patterns shown in FIG. 4(*b*), FIG. 6(*b*), and FIG. 8 successively on the specimen plane 20.

The first embodiment has described the case in which eight non-target points adjacent to a target point 2A equally contribute a light reception signal (namely, the non-confocal signals are equal to each other). However, the present invention is not limited to such a case. The present invention is applicable to the case where non-confocal signals are weighted depending on the positional relationship between a target point 2A and non-target points 2A so that the non-confocal signals differ from each other.

For example, assuming that a microarea 2A designated by "5" is a target point 2A and microareas 2A designated by "1" to "4" and "6" to "9" are non-target points, the non-confocal signal due to a non-target point 2A designated by "N" is to be $K_N \times b$ and the sum of the coefficients $K_N (=\Sigma K_N)$ is to be "1".

Second Embodiment

Figure 9:
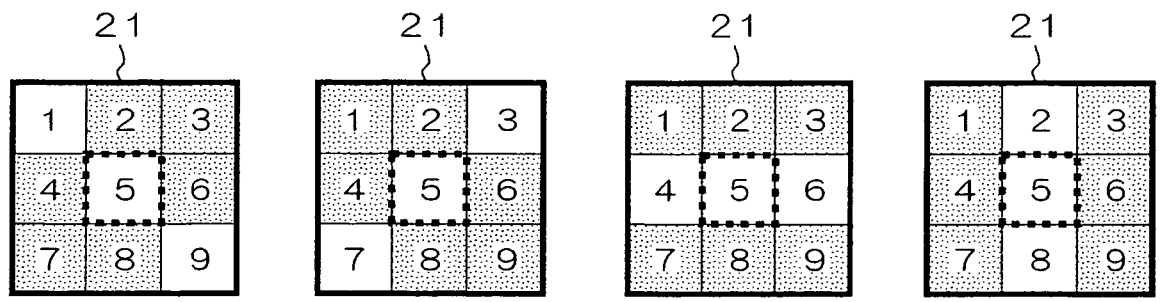
FIG. 9 is a schematic diagram showing a plurality of illumination patterns of which the number of non-target points is the same (two) and their arrangements are different according to a second embodiment of the present invention.
Figure 10:
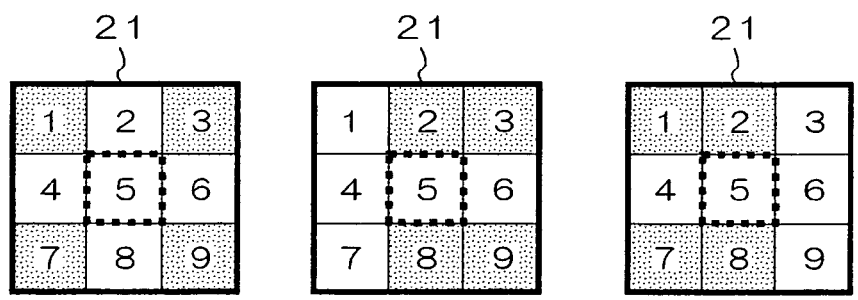
FIG. 10 is a schematic diagram showing a plurality of illumination patterns of which the number of non-target points is the same (four) and their arrangements are different according to the second embodiment of the present invention.
Figure 10:
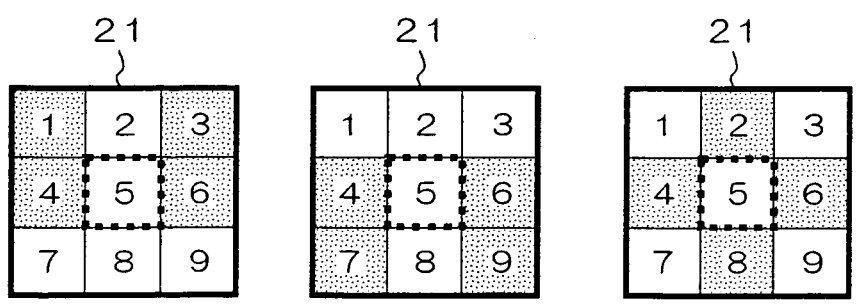

Next, a plurality of illumination patterns with the same number of non-target points 2A and different arrangements will be described (FIG. 9 and FIG. 10).

In four illumination patterns shown in FIG. 9, a microarea 2A designated by "5" in a unit 21 is a target point 2A and two microareas 2A adjacent thereto are non-target points 2A. Although the positions of the non-target points 2A are different depending on the illumination patterns, it is possible to illuminate eight microareas 2A adjacent to the target point 2A and designated by "1" to "4" and "6" to "9" one at a time in order by forming these four illumination patterns successively on a specimen plane 20.

In this case, light reception signals (S1(1) to S1(4)) that are output from a light reception portion 8A conjugated with a target point 2A designated by "5" are successively captured in the illumination patterns shown in FIG. 9. The sum S3 of these light reception signals is determined as a final light reception signal, and is expressed by the following formula (3).

$$S3 = S1(1) + S1(2) + S1(3) + S1(4) \quad (3)$$
$$= a \times 4 + (1/8)b \times 8$$
$$= 4a + b$$

On the other hand, in six illumination patterns shown in FIG. 10, a microarea 2A designated by "5" in a unit 21 is designated as a target point 2A and four microareas 2A adjacent thereto are designated as non-target points 2A. Although the positions of the non-target points are different depending on the illumination patterns, it is possible to illuminate the eight microareas 2A adjacent to the target point 2A and designated by "1" to "4" and "6" to "9" three times each in order by forming these six illumination patterns on the specimen plane 20 successively.

In this case, light reception signals (S2(1) to S(6)) that are output from a light reception portion 8A conjugated with the target point 2A designated by "5" are successively captured in the illumination patterns shown in FIG. 10. The sum S4 of the captured light reception signals is determined as a final light reception signal, and is expressed by the following formula (4).

$$S4 = S2(1) + S2(2) + S2(3) + S2(4) + S2(5) + S2(6) = a \times 6 + (1/8)$$
$$b \times 24 = 6a + 3b \quad (4)$$

According to the second embodiment, light reception signals (S3 and S4) are successively obtained in different illumination states that areas other than the target point 2A in the unit 21 are illuminated in different manners (the number of non-target points 2A is different in each of the illumination patterns), to generate a confocal signal (a) corresponding to the intensity of fluorescence light emitted from the target point 2A by simultaneously applying the foregoing formula (3) for the relationship between one light reception signal (S3) and the number of non-target points (two) and the foregoing formula (4) for the relationship between the other light reception signal (S4) and the number of non-target points (four).

Figure 5:
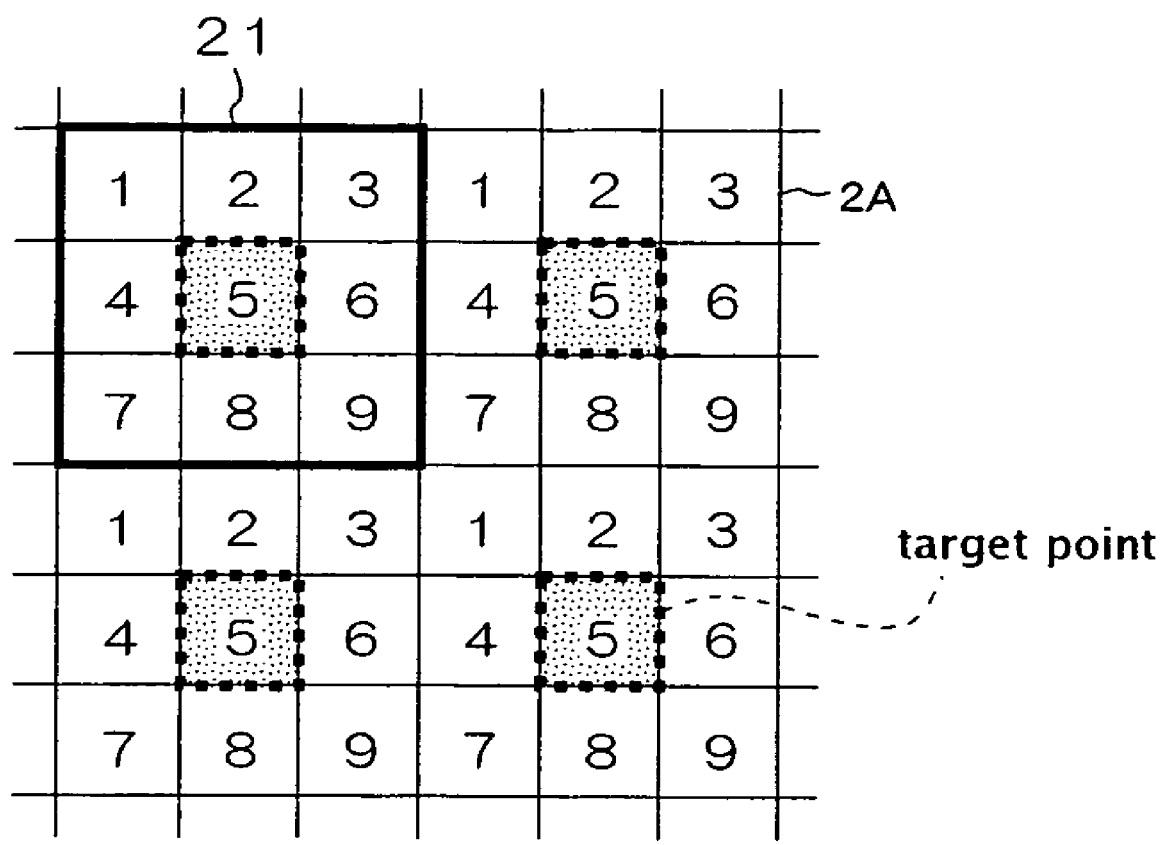
FIG. 5 is a schematic diagram showing an illumination pattern with which eight non-target points 2A are illuminated.

As is clear from the foregoing formulas (3) and (4), the term with respect to the non-confocal signals is an integer multiple of a non-confocal signal (b) corresponding to total intensity of leaked light from all the microareas 2A (the non-target points 2A designated by "1" to "4" and "6" to "9"

shown in FIG. 5) other than the target point 2A designated by "5". Thus, even if the amount of contribution to the light reception signals change depending on the positional relationship between the target point 2A and non-target points, the confocal signal (a) with respect to the target point 2A can be generated with high reproducibility without affected by the change.

Confocal signals (a) generated in ten types of illumination patterns shown in FIG. 9 and FIG. 10 are signals associated with the target point 2A designated by "5" in the unit 21. The remaining microareas 2A designated by "1" to "4" and "6" to "9" are successively designated as a target point 2A, thereby generating confocal signals (a) associated with these target points 2A in 10 types of illumination patterns (that differ in the number of target points 2A).

Figure 12:
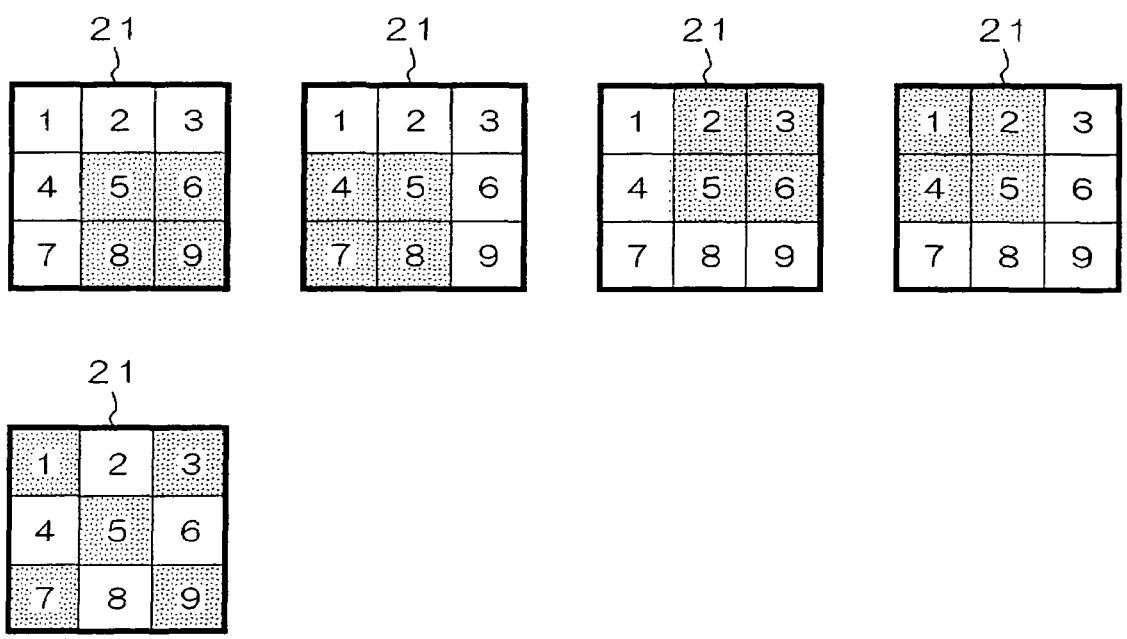
FIG. 12 is a schematic diagram showing another illumination pattern with which a target point 2A and four non-target points 2A are simultaneously illuminated.
Figure 13:
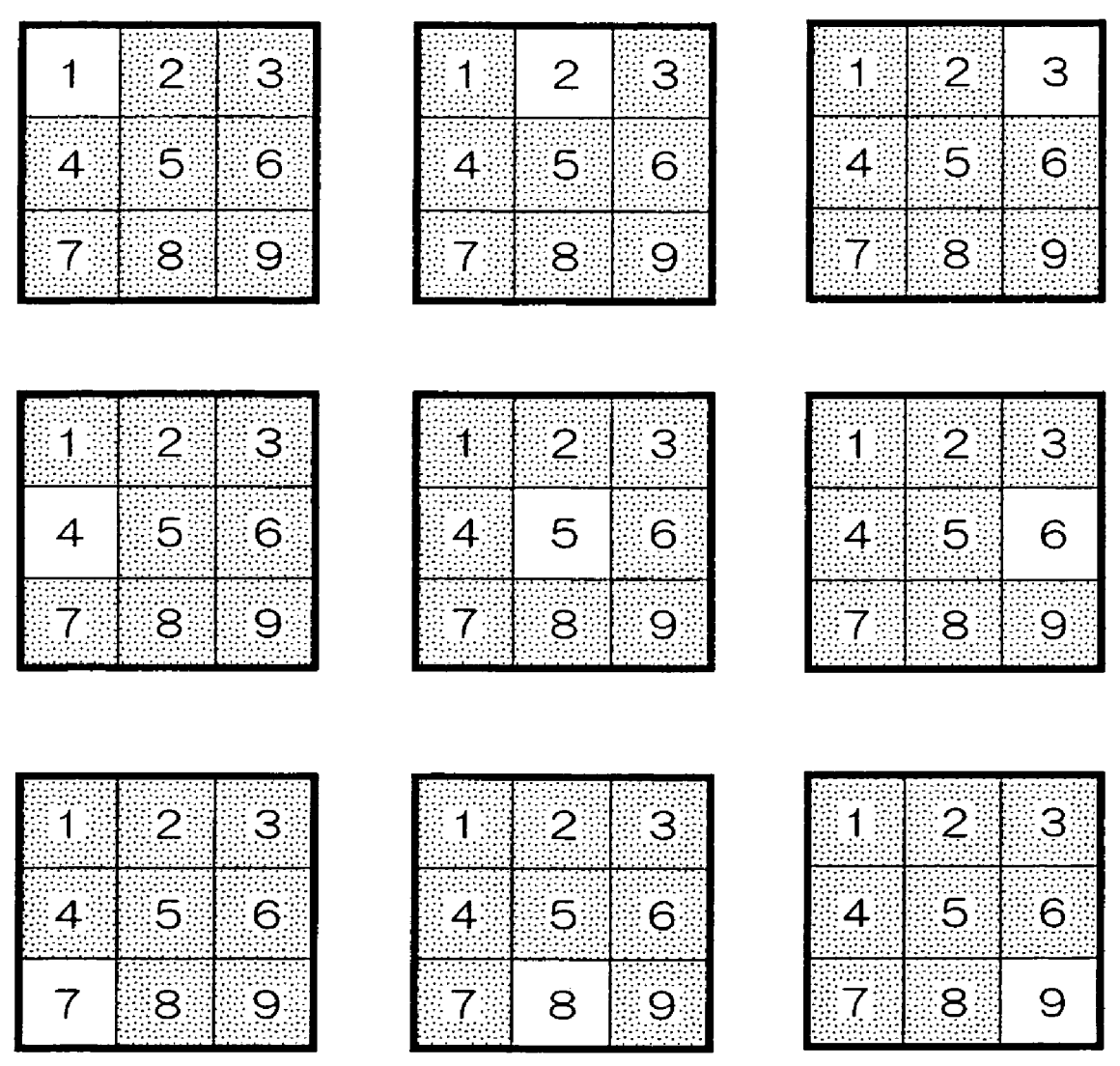

However, also in this case, there are illumination patterns that can be used in common, as described on the example where the illumination patterns in FIG. 4(a) and FIG. 5(a) are compared. Thus, 13 types of illumination patterns shown in FIG. 12 and FIG. 13 are successively formed in addition to the ten types of luminance patterns shown in FIG. 9 and FIG. 10, which cover all necessary illumination patterns.

Figure 11:
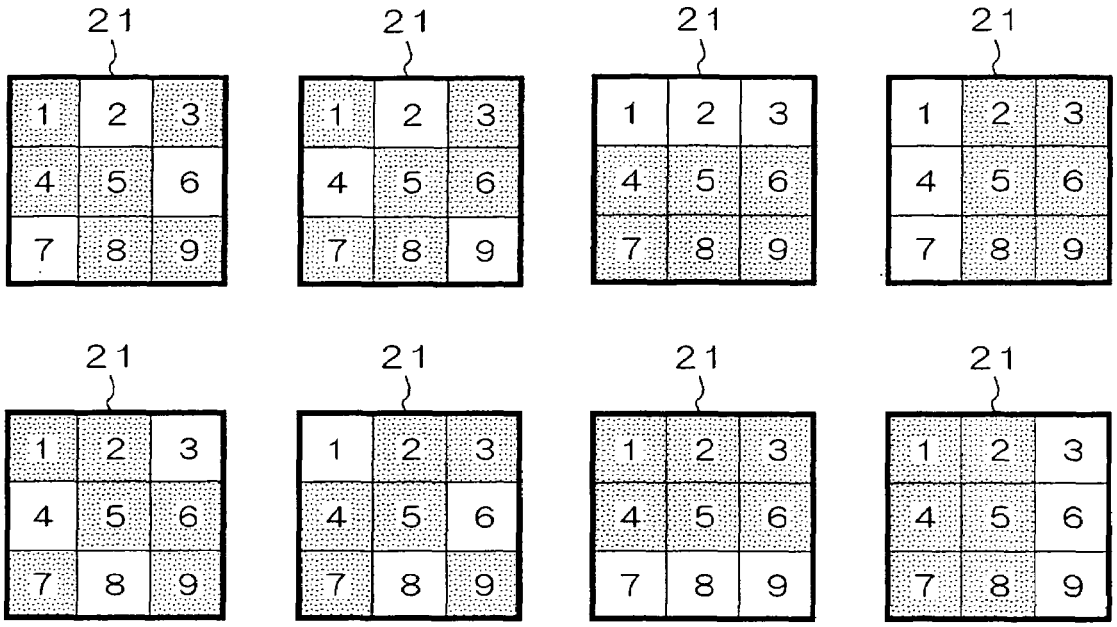
FIG. 11 is a schematic diagram showing another illumination pattern with which a target point 2A and two non-target points 2A are simultaneously illuminated.

Light reception signals (S3) associated with microareas 2A designated by "1" to "9" in a unit 21 can be effectively obtained in the 12 types of illumination patterns shown in FIG. 9 and FIG. 11. Light reception signals (S4) associated with microareas 2A designated by "1" to "9" can be effectively obtained in the 11 types of illumination patterns.

Thus, according to the second embodiment, since target points 2A are two-dimensionally scanned on the specimen plane 20 in a plurality of illumination patterns (FIG. 9, FIG. 10, and so forth) with the same number of non-target points 2A and different arrangements, an image intensity distribution on the specimen plane 20 can be obtained with high resolution and high reproducibility.

In addition, according to the second embodiment, simultaneously illuminating a plurality of target points 2A arranged with the interval D1(=D2×3) to maintain the confocal effect on the specimen plane 20 and non-target points arranged with an interval too narrow to maintain the confocal effect with each of the target points 2A makes it possible to improve light use efficiency of the light source 11.

In this case, the average value E of light use efficiency is expressed by the following formula (5) with time necessary for successively forming all illumination patterns (23 types) taken into consideration.

$$E=\{(12/23)\cdot[3/9]+(1/23)\cdot[4/9]+(10/23)\cdot[5/9]\}\times[10/23] = 0.189 \quad (5)$$

where fractions (3, 4, and 5) of values in [ ] represent the number of illuminated microareas 2A; fractions (12, 1, and 10) of values in ( ) represent the number of illumination patterns per illuminated microarea 2A; and a fraction (10) of a value in [ ] represents the number of illumination patterns calculated to generate a confocal signal.

To compare the light use efficiency expressed in the formula (5) with that in the prior art case, the light use efficiency E' is calculated by the following formula (6) in which only a plurality of target points 2A with the interval D1(=D2×3) to maintain the confocal effect are illuminated (with use of the nine types of illumination patterns shown in FIG. 13).

$$E'=\{(9/9)\cdot[1/9]\}\times[1/9]=0.0123 \quad (6)$$

As is clear from the foregoing numerical calculation, according to the second embodiment, the light use efficiency of the light source 11 is remarkably improved, thereby improving the S/N ratio. Thus, the confocal observation can be accurately performed.

Third Embodiment

The control section 19 also generates a non-confocal signal (b) at the time of generating a confocal signal (a) by simultaneously applying the foregoing formulas (1) and (2) (or formulas (3) and (4)). The non-confocal signal (b) is a signal corresponding to the total intensity of leaked light of all the microareas 2A (for example, eight non-target points 2A designated by "1" to "4" and "6" to "9" shown in FIG. 5) other than the target point 2A.

In addition, a difference signal (a–b) between the confocal signal (a) and the non-confocal signal (b) is generated as an image intensity distribution on the specimen plane 20. It is considered that the difference signal (a–b) represents information on an area narrower than the confocal signal (a) on the specimen plane 20. Thus, the image intensity distribution on the specimen plane 20 corresponding to the difference signal (a–b) has a higher resolution than that corresponding to the confocal signal (a). Next, this theory will be qualitatively described.

Figure 14:
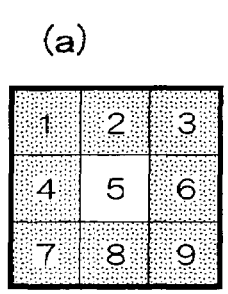
FIG. 14 is a schematic diagram showing a difference obtaining processing according to a third embodiment of the present invention.
Figure 14:
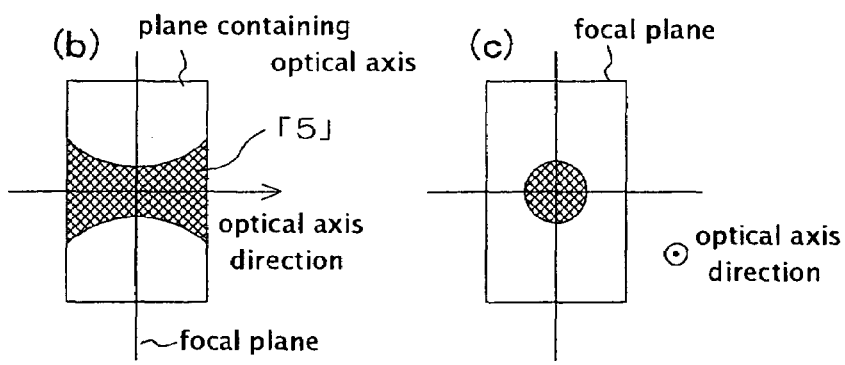
Figure 14:
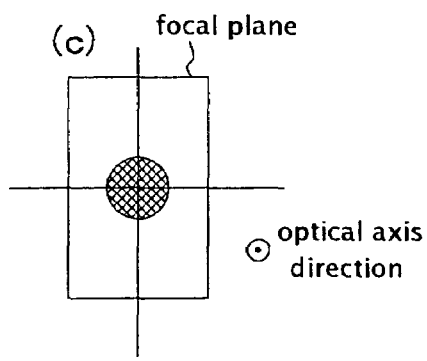
Figure 14:
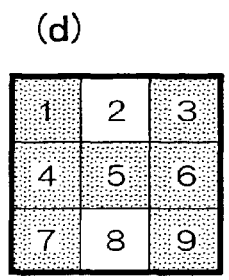
Figure 14:
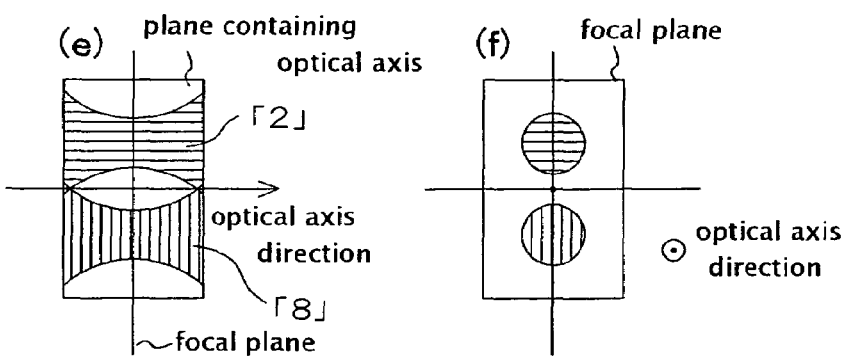
Figure 14:
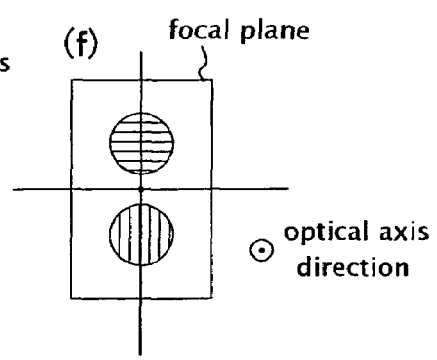
Figure 14:
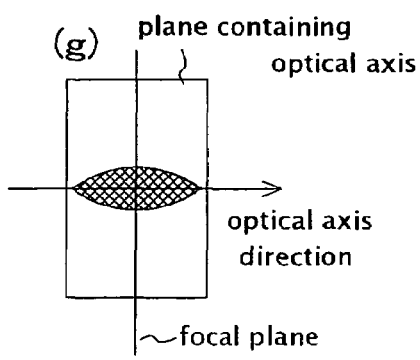
Figure 14:
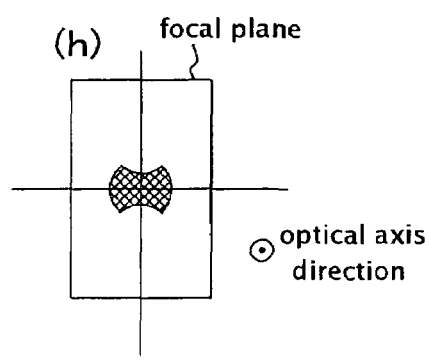

When only a target point 2A designated by "5" is illuminated in an illumination pattern shown in FIG. 14(a) and a target point 2A is on the optical axis (see FIG. 14(b) and FIG. 14(c)), a light reception signal that is output from a light reception portion 8A conjugated with the target point 2A is a confocal signal (a). In addition, an illumination area on a specimen plane 20 has a shape as shown in FIG. 14(b).

On the other hand, when non-target points 2A designated by "2" and "8" adjacent to a target point 2A designated by "5" are simultaneously illuminated as shown in an illumination pattern shown in FIG. 14(d) and the target point 2A is on the optical axis (see FIG. 14(e) and FIG. 14(f)), a light reception signal that is output from a light reception portion 8A conjugated with the target point 2A is a non-confocal signal (b). An illumination area on the specimen plane 20 has a shape as shown in FIG. 14(e).

Information on the specimen plane 20 contained in the difference signal (a–b) of the confocal signal (a) and the non-confocal signal (b) corresponds to hatched portions shown in FIG. 14(g) and FIG. 14(h). Thus, it is clear that they are narrower than those shown in FIG. 14(b) and FIG. 14(c). Thus, by performing the difference obtaining processing, the resolutions in the optical axis direction and on the plane are improved.

To quantitatively represent the effect of the difference obtaining processing, an optical transfer function of an image intensity distribution corresponding to the difference signal (a–b) is shown in FIG. 15(b). In addition, for comparison, an optical transfer function of an image intensity distribution corresponding to the confocal signal (a) is shown in FIG. 15(b). In FIG. 15, the horizontal axis represents a frequency Nz [1/μm] in the optical axis direction, whereas the vertical axis represents an optical transfer function (OTF).

In this simulation, the difference obtaining processing is performed with non-confocal signals shown in FIG. 14(d) to FIG. 14(f). In this simulation, wavelength is 0.55 μm; numerical aperture is 0.75; and magnification is 40. The size of each microarea 2A is set at 25 μm so that leaked light from the outside of the unit 21 is negligible. As is clear from the comparison of FIG. 15(a) and FIG. 15(b), in the range of the frequency Nz from 0.0 to 0.8, the optical transfer function (a) when the difference obtaining processing is performed shows larger values than the optical transfer function (b) when the processing is not performed.

Example of Modification

The foregoing embodiments has described examples of an illumination pattern containing two non-target points 2A and an illumination pattern containing four non-target points 2A. However, the present invention is not limited to these examples. In other words, the present invention can be applied to the case of which the number of non-target points is at least one and at least two types of illumination patterns that differ in the number of non-target points 2A are used. Moreover, in one of a plurality of illumination patterns that differ in the number of non-target points 2A, illumination to the non-target points may be shielded. In addition, when three or more types of illumination patterns that differ in the number of non-target points 2A are used, it is preferred that simultaneous equations be solved by the least square method. In this case, since the data amount is large, the accuracy is improved.

The foregoing embodiments has described the example in which each unit is composed of a total of nine microareas 2A in an array of 3×3. However, the present invention is not limited to this example. It is preferred that the sizes of a unit 21 and a microarea 2A be decided according to the size of an illumination area that affects a light reception signal. The array of the unit 21 may be an even number×an even number. However, it is preferred that the array be an odd number×an odd number (for example, 5×5) because the influence of leaked light from a non-target point can be isotropically considered.

Further, the foregoing embodiments have described the example in which a reflection type spatial optical modulation device (for example, a mirror device 14) is used commonly on the illumination optical path and the received light optical path. However, the present invention is not limited to this example. For a confocal observation for a light transmissible specimen plane 20, identical spatial optical modulation devices may be disposed on each of the illumination optical path and the received light optical path and for synchronous control. In addition, a transmissible spatial optical modulation device (for example, a transmissible optical device having many two-dimensionally arranged liquid crystal cells) may be used instead of the reflection type spatial optical modulation device.

The invention is not limited to the above embodiments and various modifications may be made without departing from the spirit and scope of the invention. Any improvement may be made in part or all of the components.

What is claimed is:

1. A confocal microscope, comprising:
   an illumination section which concentrates illumination light to each of a target point and one or more non-target points of a specimen for simultaneous illumination, each non-target point being adjacent to the target point, the target point and adjacent non-target points being arranged at intervals too narrow to maintain a confocal effect;
   a light reception section which receives light entering into a light reception portion conjugate with the target point, without distinguishing between emitted lights from the target and non-target points under illumination by said illumination section, and which outputs a light reception signal in accordance with an intensity of the received light;
   a control section which controls said illumination section and thereby changes illumination of a number of the non-target points successively, and which receives light reception signals which are output from said light reception section before and after the change in the number of the non-target points; and
   a generation section which generates a confocal signal in accordance with an intensity of light emitted from the target point, based on a relationship between a plurality of the light reception signals and the changed number of non-target points.

2. The confocal microscope as set forth in claim 1, wherein
   said generation section generates the confocal signal and a non-confocal signal and generates a difference signal between the confocal signal and the non-confocal signal, the non-confocal signal corresponding to an intensity of light emitted from the non-target points.

3. The confocal microscope as set forth in claim 1, wherein
   said illumination section changes illumination of said specimen among different plural numbers of non-target points in response to control by said control section.

4. The confocal microscope as set forth in claim 1, wherein
   said illumination section includes a plurality of spatial optical modulation devices each controlling the illumination of a corresponding point of the specimen.

5. The confocal microscope as set forth in claim 4, wherein
   said spatial optical modulation devices include adjustable mirrors.

6. The confocal microscope as set forth in claim 5, wherein
   said adjustable mirrors are elements of a digital micromirror device.

* * * * *

UNITED STATES PATENT AND TRADEMARK OFFICE
CERTIFICATE OF CORRECTION

PATENT NO. : 7,369,309 B2
APPLICATION NO. : 11/429998
DATED : May 6, 2008
INVENTOR(S) : Tomoko Ujike and Tomoya Noda Page 1 of 1

It is certified that error appears in the above-identified patent and that said Letters Patent is hereby corrected as shown below:

On the title page, item (75) should read as follows:

(75) Inventors: Tomoko Ujike, Hukaya (JP); Tomoya Noda, Kumagaya (JP)

Signed and Sealed this

Seventeenth Day of November, 2009

David J. Kappos
*Director of the United States Patent and Trademark Office*